(12) United States Patent
Houlsdworth

(10) Patent No.: US 6,237,072 B1
(45) Date of Patent: May 22, 2001

(54) MEMORY MANAGEMENT WITH COMPACTION OF DATA BLOCKS

(75) Inventor: Richard J. Houlsdworth, Horley (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/139,203

(22) Filed: Aug. 24, 1998

(30) Foreign Application Priority Data

Aug. 22, 1997 (GB) .................................................. 9717718

(51) Int. Cl.⁷ ...................................................... G06F 12/00
(52) U.S. Cl. ............................................ 711/171; 707/206
(58) Field of Search .............................. 711/171; 707/206

(56) References Cited

U.S. PATENT DOCUMENTS

| | | | |
|---|---|---|---|
| 5,479,656 | * 12/1995 | Rawlings, III | 707/200 |
| 5,652,865 | * 7/1997 | Rawlings, III | 711/171 |
| 5,784,699 | * 7/1998 | McMahon et al. | 711/171 |
| 5,848,423 | * 12/1998 | Ebrahim et al. | 707/206 |

OTHER PUBLICATIONS

"Uniprocessor Garbage Collection Techniques", Paul R. Wilson, Proc. of the 1992 International Workshop on Memory Management, St. Malo, France, Sep. 1992.

"Garbage Collection: Algorithms for Automatic Dynamic Memory Management" by R. Jones et al, Pub. John Wiley & Sons, 1996, ISBM 0–471–94148–4, pp. 1–18.

* cited by examiner

Primary Examiner—Matthew Kim
Assistant Examiner—Matthew D. Anderson

(57) ABSTRACT

A method and apparatus are provided for management of stored data in the form of data blocks interspersed with free blocks in a fixed size system memory. A compaction procedure, periodically applied to the memory, repositions those data blocks identified (107) as moveable such as to increase the extent of free block contiguity within the memory. The search for a suitable free block (114–117) for housing a relocated data block is sequentially applied for each data block; a data block is moved (118) to a free block if the free block is greater than or equal to the data block size and less than or equal to the size of the data block when added to the size of any free block abutting the original data block position.

10 Claims, 3 Drawing Sheets

MEMORY MANAGEMENT WITH COMPACTION OF DATA BLOCKS

BACKGROUND OF THE INVENTION

The present invention relates to a method and apparatus for handling stored data and particularly, but not exclusively, to memory compaction during garbage collection in a real or virtual memory space of a data processing apparatus.

Garbage collection is the automated reclamation of system memory space after its last use by a programme. A number of examples of garbage collecting techniques are discussed in "Garbage Collection: Algorithms for Automatic Dynamic Memory Management" by R. Jones et al, pub. John Wiley & Sons 1996, ISBN 0-471-941484, at pages 1 to 18, and "Uniprocessor Garbage Collection Techniques" by P.R. Wilson, Proceedings of the 1992 International Wyrkshop on Memory Management, St. Malo, France, September 1992. While the storage requirements of many computer programs are simple and predictable, with memory allocation and recovery being handled by the programmer or a compiler, there is a trend toward languages having more complex patterns of execution such that the lifetimes of particular data structures can no longer be determined prior to run-time and hence automated reclamation of this storage, as the program runs, is essential.

One particular class of garbage collection/memory reclamation techniques, as described in the above-mentioned Wilson reference, is mark-compact collection. In common with many garbage collection techniques, it is a two-stage procedure and, as its name suggests, it involves first marking all stored objects that are still reachable by tracing a path or paths through the pointers linking data objects. Thereafter, the memory is compacted, moving the marked objects stored in the memory to a contiguous area of memory to leave a space containing only redundant objects, which space may then be reclaimed.

Fragmentaton of system memory is a problem which is particularly acute with garbage collected memory systems. Methods for compaction of memory, such as mark-compact collection, where all memory blocks are moveable are well known. However, the situation where there is a variety of fixed and moveable data, interleaved in an arbitrary fashion, causes problems.

Applying conventional defragmentation techniques in circumstances where there are unmoveable blocks may still leave memory in a partially fragmented state, that is to say composed of collected groups of filled memory blocks interspersed with more than one area of free memory. The consequence of this is that the allocator (the system function allotting storage locations to memory blocks) needs to be designed to work with partially fragmented memory. Also, an overall monitoring and control function must be applied to ensure that defragmentation actually results in a more useful memory organization than before compaction. As memory allocation patterns are arbitrary and unpredictable, the suitability of memory organizations for a particular size of allocation cannot be known before the allocation actually occurs.

SUMMARY OF THE INVENTION

It is an object of the present invention to provide a method for dynamic allocation of storage locations in a random-access memory that can accommodate the limitations imposed by having some stored memory blocks unmovable from a respective storage location.

It is a further object to provide a data processing apparatus embodying such a method in the handling of data storage.

In accordance with the present invention, there is provided a method for management of stored data in the form of data blocks interspersed with free blocks in a fixed size memory. A compaction procedure is periodically applied during which the data blocks are moved together such as to increase the extent of free block contiguity within the memory. Some of the data blocks are fixed in memory location and not moved by the compaction procedure and the remainder are tested in sequence to determine whether a free block location is available for that block such as to improve the overall distribution. A data block is moved to a free block if the free block is greater than or equal to the data block size and less than or equal to the size of the data block when added to the size of any free block abutting the original data block position.

This motion condition enables a relatively rapid determination of a suitable location for moving a data block. This method may improve the efficiency of compaction without adding undue burden to the search procedure for identifying suitable free blocks.

To prevent unnecessary movement of blocks in an existing "best fit" location, any data block not abutted by at least one free block is suitably treated as fixed in memory location. The method described above may further comprise the step of determining, following movement of a data block, whether the block preceding the new data block location is a free block and, if so, moving the data block down to the preceding free block location. This use of sliding compaction can reduce small spaces appearing although preferably, as will be described, a data block is not moved down to a preceding free block location if said preceding free block is smaller than said data block.

Also in accordance with the present invention there is provided a data processing apparatus comprising a data processor coupled with a random-access memory containing a plurality of data objects interspersed with free blocks. Each data object and free block is at a respective known location within the memory. The apparatus is configured to periodically apply a compaction procedure during which at least some of the data blocks are repositioned within the memory such as to increase the extent of free block contiguity. Some of the data blocks are fixed in memory location with the apparatus comprising means operable to identify fixed blocks and exclude them from the compaction procedure. Search means are configured to determine, for each of the remaining data blocks, whether a free block location is available for that block to improve the overall distribution. The search means moves a data block to a free block if the free block is greater than or equal to the data block size and less than or equal to the size of the data block when added to the size of any free block abutting the original data block position.

A free block memory may be provided coupled with the search means and holding, for each size of free block in the random-access memory, the random-access memory address for the, or at least one of the, free blocks. In such a case, the addresses for all free blocks of a common size may be stored as a linked list in the free block memory, with entries in the linked list suitably being stored in order of lowest to highest random-access memory address, with the lowest forming the list header. With this latter arrangement, the list headers may be referenced in free block memory as nodes of a binary tree structure, with the search means configured to traverse the structure to identify free blocks of a selected size. In order to reduce the extent of required tree-traversal, the free block memory may comprise a plurality of binary tree structures, each referencing a different range of free block sizes, with a header array identifying the location in the free block memory of the header node of each binary tree. Further features and advantages of the present invention are recited in the attached claims or will become apparent from reading of the following description of example embodiments.

BRIEF DESCRIPTION OF THE DRAWINGS

The invention will now be described by way of example only, with reference to the accompanying drawings, in which.

DESCRIPTION OF THE PREFERRED EMBODIMENTS

Figure 1:
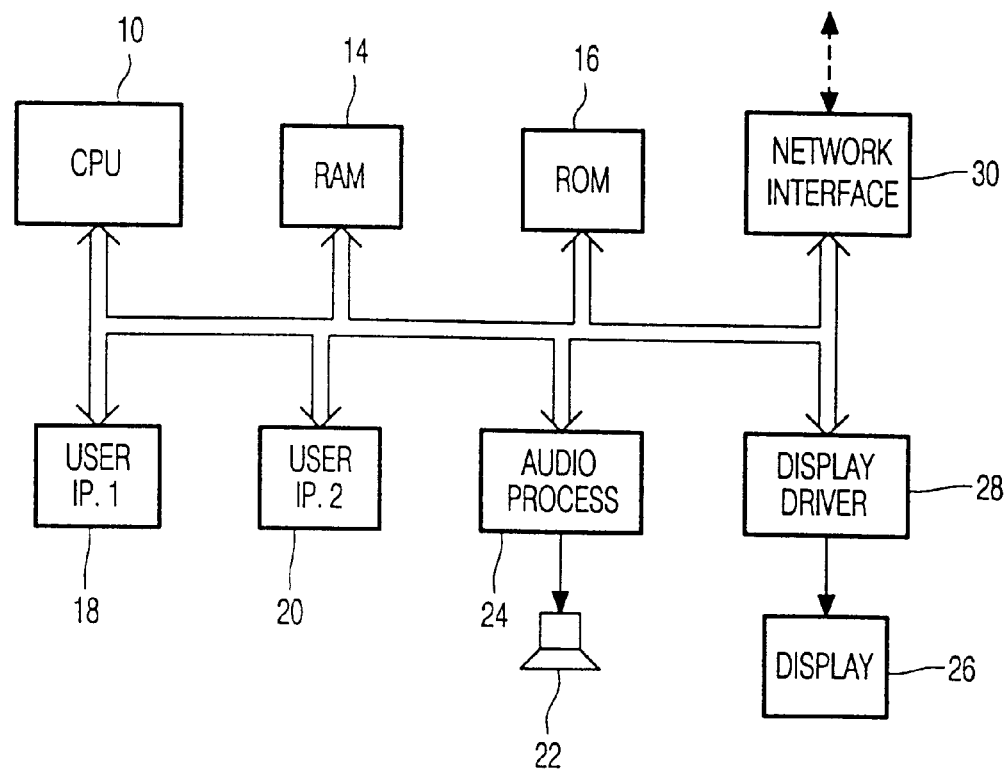
FIG. 1 is a block diagram of a data processing system suitable to embody the present invention.

FIG. 1 represents a data processing system, such as a personal computer, which acts as host for a number of software utilities which may, for example, configure the system as a browser for data defining a virtual environment. The system comprises a central processing unit (CPU) 10 coupled via an address and data bus 12 to random-access (RAM) and read-only (ROM) memories 14, 16. These memories may be comprised of one or several integrated circuit devices and may be augmented by a system hard-disk as well as means to read from additional (removable) memory devices, such as a CD-ROM. The present invention is particularly embodied in memory management for a working area of the RAM 14 under control of the CPU 10. A controlling program for this may initially be held in ROM 16 and loaded up with the operating system on power-up.

Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. Video output from the system is presented on display screen 26 driven by display driver stage 28 under control of the CPU 10.

A further source of data for the system is via online link to remote sites, for example via the Internet, to which end the system is provided with a network interface 30 coupled to the bus 12. The precise construction of the interface is not an essential feature of the present invention, although it will be recognized that the interface configuration will depend on the type of data network to which the system is to be coupled. For example, where the system is for use by a private home user, the data link is likely to be a telephone connection to a local service provider. In such a case, the interface 30 will suitably incorporate a modem. For other types of data link, such as an ISDN connection, the interface will be configured accordingly.

Figure 2:
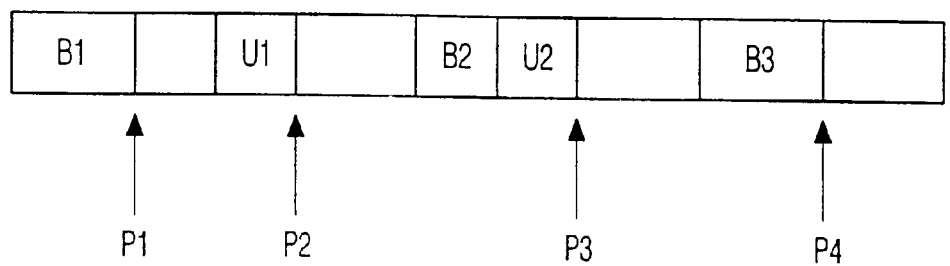
FIG. 2 represents a contiguous section of memory containing both moveable and immovable blocks of data.

The problem to be overcome in the allocation of storage locations in RAM 12 is schematically illustrated in FIG. 2 which represents a contiguous area of memory containing both moveable (B1, B2, B3) and unmoveable (U1, U2) blocks of data interspersed with blocks of free memory. Pointers P1 to P4 indicate the start of respective free blocks. The free memory may be unused or it may contain data which has served its function and has been identified as redundant (i.e. it can be safely overwritten). In the following description, it is assumed that the contiguous area of memory can be scanned linearly for blocks, thereby implying the provision of a length field in each object, or some other means for indicating where the next object starts. It will be recognized, however, that the invention is not so limited to linear scanned memories, with other configurations being possible, as long as relative locations and types of stored data object may be determined.

The purpose of compaction is to move blocks B1, B2 and B3 so that the free space is arranged in the best way to suit the maximum number of potential allocation requests. Good free space organizations have the fewest number of free blocks and the largest size of free blocks. The best organization (from the point of view of operational flexibility) is to have a single free block but, as will be recognized, the presence of the fixed blocks means there may have to be multiple free blocks.

In the example, moving block B3 to block space P3 will merge spaces P3 and P4, which improves the situation as the combined free space can satisfy more allocation requests. However, if block B3 fits in space P1 or P2, then spaces P3 and P4 are merged, but the size of spaces P1 or P2 are reduced to smaller sizes (that is to say their original size less the size of block B3), which may be less useful for subsequent allocations. Moving block B2 to space P2 does not change the situation at all, and motion to space P1, P3 or P4 increases space P2 at an equal expense to another block. This move is only worthwhile if block B2 closes a free block completely. The same applies to block B1.

The compaction procedure is operated in real-time under control of the system CPU (10; FIG. 1) concurrently with the operation of the system. In this example, the locking system utilized by the system memory manager indicates that an item (data block) is instantaneously unmoveable, but the lock may be obtained and released during the progress of the procedure. Therefore, the system can not be analyzed at a single point to determine which are the fixed blocks, as the analysis would immediately become invalid.

In a preferred embodiment, the memory management system takes, as its starting condition, that large free blocks are preferable and are to be obtained wherever possible. Considering the potential space released (the source) by the movement of a candidate block to elsewhere in memory, this is given by:

Source=Size of the previous block (if free)+size of the candidate block+size of the next block (if free)

The movement has a positive effect if the size of the free block at the destination is smaller than this amount. Ideally, the destination block size should equal the size of the moveable block, as this removes a fragment of free space, although leaving small areas of free memory at the destination is generally unavoidable in a practical system, with the rejection of non-exact fits being counterproductive. The resulting full motion condition may be written as:

Block size<=Destination size<=Source size

It will be recognized that this formulation leaves the possibility that a block bounded by two other used blocks can be moved if there is an exact fit elsewhere, although this is not a useful movement as no benefit is gained. In order to avoid this situation, either the case (Previous is free) or (Next is free) is added to the full motion condition, or the condition is limited as:

Block size<=Destination size<Source size

Figure 3:
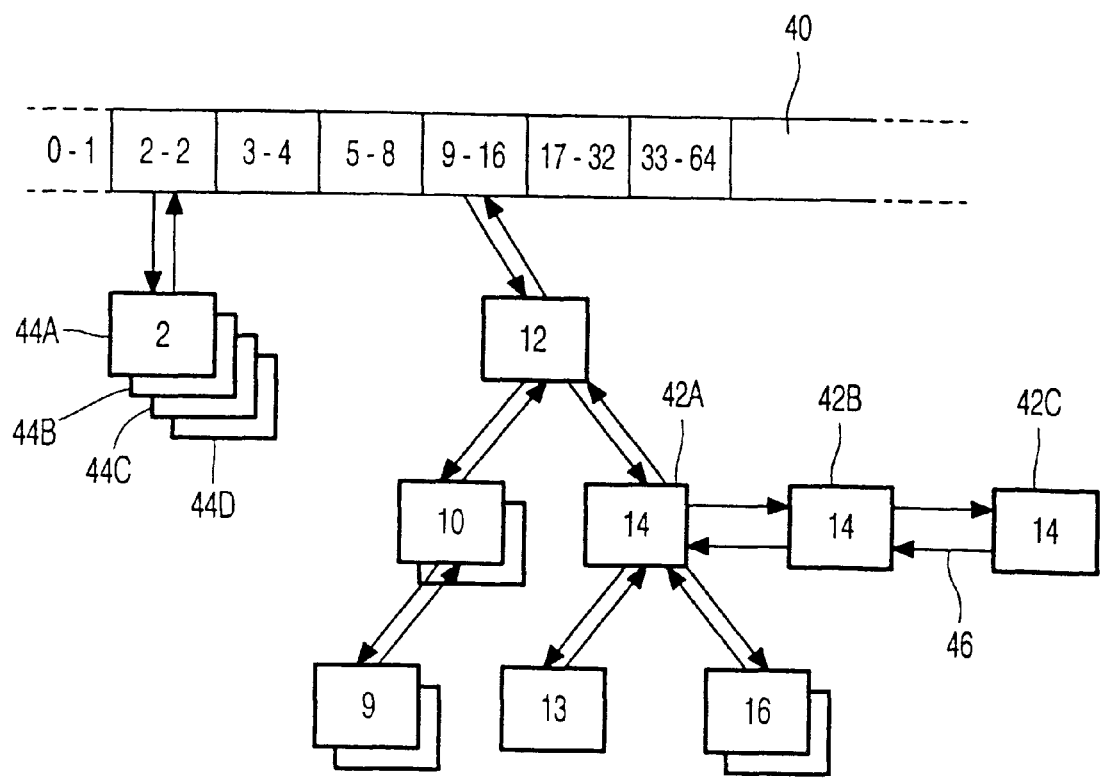
FIG. 3 shows part of a managed binary tree list referencing free memory blocks, such as those in FIG. 2.

The system requires a mechanism for rapid identification of free blocks and their sizes and, as a part of this, maintains a "free" list for every size of free block available at a given time. Most operations will access only the head of each list to identify the free block of appropriate size and with the lowest address. The lists are accessed via a balanced binary tree structure, as illustrated in FIG. 3. To remove the top few levels of the binary tree, there are separate trees for data blocks sized between each power of 2, with only a tree for blocks in the range of 9–16 bytes being shown, for reasons of clarity, together with a linked list for objects of size 2 bytes. Nodes are only included where there are one or more free space blocks of that size in the memory, such that it is unlikely that full binary trees will occur at anything other than the lowest levels. The nodes forming the heads of the trees are accessed directly from a top-level array 40. The particular arrangement (divisions by powers of 2) is chosen because the higher potential size of the trees for large free blocks will be at least partially offset by the smaller number of larger free blocks created.

The array 40 may be arranged as shown with elements separated in the ranges $2^{(n-1)}<X<=2^n$, giving element ranges 0–1, 2–2, 3–4, 5–8, and so on. Alternatively, the separation may be given by $2^{(n-1)}<=X<2^n$, which gives element ranges 0–0, 1–1, 2–3, 4–7, 8–15, and so on. This latter arrangement is preferred for ease of searching, with the first bit identifying the range.

As shown for node 42A, representing a free block of size 14 bytes, free blocks are items in a double-linked list of blocks of the same size (as shown at 42A,B,C, and 44A,B, C,D), or nodes in the tree. Nodes (42A, 44A) are the heads of the list, and contain pointers 46 to the next item in the list, as well as to the parent node (the node representing a free block of size 12 bytes in the case of node 42A), and pointers to the children nodes (nodes representing block sizes 13 and 16 bytes), one greater, and one smaller than this node. Only node 42A and list 42B and 42C are shown expanded in FIG. 3 for reasons of clarity. This fully connected system ensures that no expensive list searching needs to be done.

The linked list from node 44A for nodes of 2 bytes illustrates one potential solution to problems which may be caused in terms of overheads for blocks of less than 4 words in length. As shown, the smaller blocks are aligned on 2 word boundaries which, while not as wasteful as aligning on 4 word boundaries so that small items are padded out, is still wasteful. Aligning on 1 word boundaries but excluding short items from the free list structure, and relying on sliding compaction (discussed hereinafter) is an improvement but may be only sporadically so.

When the compactor attempts to find a suitable placement for the current block, the appropriate section of tree is first determined via array 40 and then traversed, optionally from the lower size limit up to the upper limit. However, any block within range will generally be acceptable and the full search need not always be performed. The allocator, looking to add new blocks to the memory, also searches upwards from the requested size to find a best fit. The compaction process adjusts the internal structure of the free lists, whereas the allocator will only need to access the node at the top of each list. In terms of the FIG. 3 example, the compaction process may result in the removal of the block referenced by list item 42B: in removing this block the compactor removes the pointers from blocks 42A and 42C and sets the pointers from those blocks to each other, restoring the double link between what are now the first and second entries in the list. The free list structure is maintained consistent at all times, allowing full concurrency between the tasks by preventing compaction and allocation occurring simultaneously. The compactor will remove objects from the list during coalescing and moving actions. Tree searches only occur when it is necessary to insert the free blocks of a new size.

Figure 4:
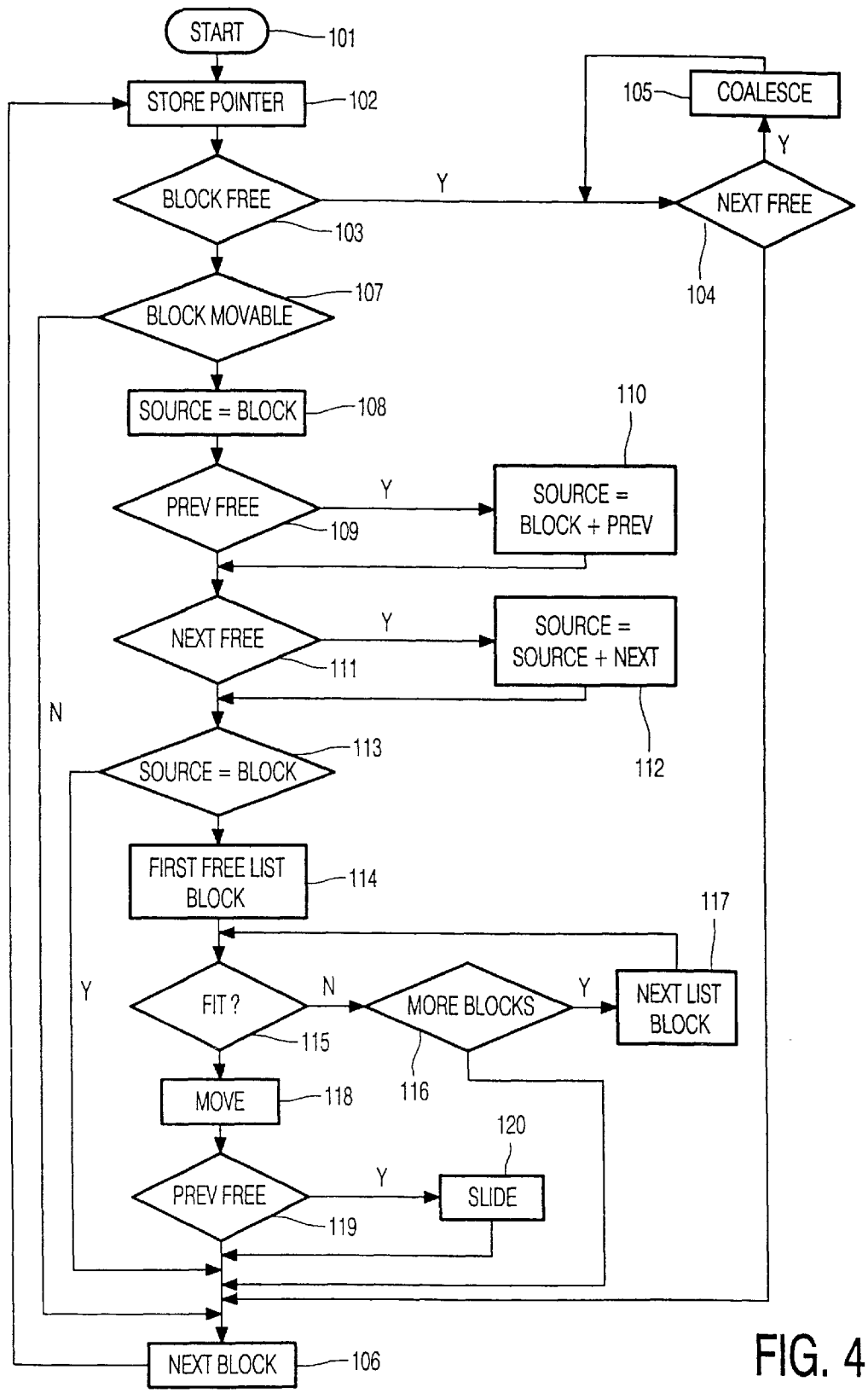
FIG. 4 is a flow chart representation of a compaction procedure embodying the invention.

The procedure employed during compaction is illustrated by the flow chart of FIG. 4, starting at 101 with the first (lowest address) block in the memory. The first operation in the iteration, the store of a pointer from this block to the previous block at 102, is omitted for this first block following which the test of step 103 determines whether the block is a free block. If the block is free, a further test 104 determines whether the next block is free and, if so, it coalesces the two (105) to a single larger block. Having coalesced the two blocks, the test as to whether the (new) next block is free 104 is repeated, followed by coalescence 105 until a used (non-free) block is encountered, at which the procedure (compaction loop) iteration concludes at 106 with selection of the next block in the memory, before recommencing with step 102 storing a pointer from the newly selected block to the previous one. It will be recognized that the coalescing of free blocks is not strictly tied in with the compaction procedure; it may instead be controlled by the allocator mechanism or as part of the garbage collection mechanism. Where coalescence is not incidentally or actually triggered during compaction, stages 104 and 105 of FIG. 4 may be omitted, with a positive result to the "Block Free?" test of 103 leading directly to selection of the next block at 106.

When the test of step 103 determines that the block is not free, the iteration proceeds to step 107 where it is determined whether the block is movable or fixed. If the block is not movable, the iteration is again concluded with selection of the next block at 106. If the block is identified as movable, the source block size is initially set to that of the block under consideration at 108, following which a check is made (109) as to whether the preceding block is free, in which case the source block size is increased from the initial block size by the size of the previous block, at 110. Following the test of the previous block (and expansion of the source if the block is free), a similar test is performed at 111 for the next block. If the next block is free, the source block size is increased by the size of that next block at 112.

Following the tests of whether next and previous blocks are free (with expansion of the source if they are), at 113 a further test is made as to whether the current value for the source block size equals the original block size. If so, neither the previous nor next blocks are free so that moving the block from its current location has no value and, unless a destination block of exactly the size of the block under consideration is found, there will be a worsening of layout. Consequently, when the test at 113 determines a block to be bounded by non- free blocks, that block will remain unmoved and the iteration again moves to selection of the next block at 106.

If the test at 113 shows the source block size to be greater than the original block size, the search of the free list begins to find a suitably sized candidate for destination block, with the first free list block selected at 114. The test of fitness for the destination block candidates, applied at 115, is whether it meets the above-described full motion condition:

Block size<=Destination size<Source size

If the free list block does not meet the above condition, a check is made at 116 as to whether there are any further blocks on the free list and, if so, the next on the list is selected at 117 and the procedure reverts to the fitness test at 115. If the test at 116 indicates that there are no further blocks on the free list, then, there are no suitable destination blocks for the block under consideration. Thereof, the iteration proceeds to step 106 and selection of the next candidate block. However, if the fitness test at 115 shows a destination block fulfilling the above motion criteria, the block under consideration is moved to the destination block, at 118, with the consequent updating of the free list structure.

Having moved a block, the compactor makes a further check at 119 as to whether the new preceding neighbor for the moved block is free. If so, at 120 a process of sliding is implemented whereby the block is moved down into the space presented by the free block. Down in this case is towards the first block in memory at the lowest address. The motion of free blocks to higher memory space and data to low memory space is implicit in the approach and, in an operational optimization, only lower memory is scanned for free blocks capable of holding the moveable memory block. Following the test at 119 (or sliding at 120 if implemented) the iteration closes with selection of the next block at 106. In order to avoid anomalies, each iteration of the compactor loop is an atomic operation, with the previous, current and next items not changing their state during the iteration.

The use of sliding compaction retains locality of reference and reduces the size of the free list, with only free blocks positioned before unmoveable blocks being placed on the free list. In step 120, a block is only shifted down in memory if the move is non-overlapping, that is to say the size of the preceding block exceeds that of the block being moved. Non-overlapping moves are potentially useful with highly incremental operations as access to the data can occur during the move (with some extra overhead). This constraint will tend to prevent small movements which will release little memory.

Although defined principally in terms of a software implementation, the skilled reader will be well aware that the above-described functional features could equally well be implemented in hardware, or in a combination of software and hardware.

From reading the present disclosure, other modifications will be apparent to persons skilled in the art. Such modifications may involve other features which are already known in the design, manufacture and use of data processing and storage apparatus and devices and component parts thereof and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A compaction method for management of stored data in the form of data blocks, comprising the steps of: identifying if any of the data blocks are fixed in memory location and cannot be moved;

testing a remainder of the data blocks in sequence to determine whether a free block location is available for a first data block;

determining if the free block is greater than or equal to a data block size of the first data block;

determining if the free block is less than or equal to the data block size of the first data block when added to a size of any free block abutting an original position of the first data block; and moving the first data block to the free block if both of the determining steps are true.

2. A method as claimed in claim 1, wherein any data block not abutted by at least one free block is treated as fixed in memory location.

3. A method as claimed in claim 1, further comprising the step of determining, following movement of the first data block, whether a block preceding the new location is a free block and, if so, moving the first data block down to the preceding free block location.

4. A method as claimed in claim 3, wherein the first data block is not moved down to the preceding free block location if a size of the preceding free block is smaller than the first data block.

5. A data processing apparatus comprising:

a data processor;

a random-access memory, coupled to the data processor, containing a plurality of data objects interspersed with free blocks, each said data object and said free block being at a respective known location within the memory, wherein the data processor being configured to periodically apply a compaction procedure during which at least some of the data blocks are repositioned within the memory such as to increase the extent of free block contiguity, and wherein the compaction procedure includes identifying if any of the data blocks are fixed in memory location and cannot be moved, testing a remainder of the data blocks in sequence to determine whether a free block location is available for a first data block, determining if the free block is greater than or equal to a data block size of the first data block, determining if the free block is less than or equal to the data block size of the first data block when added to a size of any free block abutting an original position of the first data block and moving the first data block to the free block if both of the determinations are true.

6. An apparatus as claimed in claim 5, further comprising a free block memory coupled with the data processor and holding, for each size of free block in the random-access memory, the random-access memory address for the, or at least one of the, free blocks.

7. An apparatus claimed in claim 6, wherein the addresses for all free blocks of a common size are stored as a linked list in the free block memory.

8. A apparatus as claimed in claim 7, wherein the linked list entries are stored in order of lowest to highest random-access memory address, with the lowest forming the list header.

9. An apparatus claimed in claim 8, wherein the list headers are referenced in free block memory as nodes of a binary tree structure, with the search means configured to traverse said structure to identify free blocks of a selected size.

10. An apparatus claimed in claim 9, wherein the free block memory comprises a plurality of said binary tree structures, each referencing a different range of free block sizes, and a header array identifying the location in said free block memory of the header node of each binary tree.

* * * * *